United States Patent
Yamazaki

[11] Patent Number: 5,966,106
[45] Date of Patent: Oct. 12, 1999

[54] DRIVING CIRCUIT FOR AN ELECTRO-LUMINESCENCE ELEMENT

[75] Inventor: Hiroshi Yamazaki, Saitama-ken, Japan

[73] Assignee: Seiko Precision Inc., Tokyo, Japan

[21] Appl. No.: 09/081,173

[22] Filed: May 19, 1998

[30] Foreign Application Priority Data

May 26, 1997 [JP] Japan .................................. 9-135009

[51] Int. Cl.⁶ .................................................. G09G 3/10
[52] U.S. Cl. ............................................. 345/45; 315/169.3
[58] Field of Search .............................. 345/45, 36, 102; 315/169.3, 169.1

[56] References Cited

U.S. PATENT DOCUMENTS

| | | | |
|---|---|---|---|
| 5,066,893 | 11/1991 | Osada et al. | 345/45 |
| 5,345,146 | 9/1994 | Koenck et al. | 315/169.3 |
| 5,576,601 | 11/1996 | Koenck et al. | 315/169.3 |
| 5,581,160 | 12/1996 | Fujita | 315/169.3 |
| 5,742,132 | 4/1998 | Huber et al. | 315/209 |
| 5,814,947 | 9/1998 | Brownell | 345/36 |

*Primary Examiner*—Amare Mengistu
*Attorney, Agent, or Firm*—Amster Rothstein & Ebenstein

[57] ABSTRACT

There is provided a driving circuit for an EL element which extends the life of the EL element and has improved driving efficiency. A capacitor 11 is parallel-connected to a series circuit 3 formed by an EL element 1 and an inductor 2 to cause harmonic components and a driving frequency lower than the same to pass through the capacitor 11 and the EL element 1, respectively, to extend the life of the EL element and to improve driving efficiency.

3 Claims, 4 Drawing Sheets

[Prior Art]

DRIVING CIRCUIT FOR AN ELECTRO-LUMINESCENCE ELEMENT

BACKGROUND OF THE INVENTION

1. Field of the Invention

The present invention relates to a driving circuit for an electro-luminescence (EL) element.

2. Description of the Related Art

An EL element is used as a back light of a liquid crystal display portion included in a small electronic apparatus such as a wrist watch. There is a need for a small driving circuit for generating an AC voltage for driving this type of EL element. Since a transformer as a voltage boosting component as is generally used in the prior art is disadvantageous in pursuing compactness, a driving circuit as shown in FIG. 4 has been proposed. This circuit is similar to that disclosed in Japanese patent publication No. H8-17114 and comprises an EL element 41 and an inductor 42 connected in series to form a series circuit 43 of which the side of the EL element is grounded and of which the side of the inductor is connected to power supply terminals VEL and GND through diodes and switching elements Q1 and Q2, respectively. The circuit is alternately connected to the power supply terminals VEL and GND through the switching elements Q1 and Q2 to generate a driving AC voltage by utilizing series resonance characteristics of the EL element 41 and the inductor 42. 44 represents a constant power output circuit as a power supply. 45 represents a capacitor for stabilizing the voltage of the same. 46 represents a control circuit for controlling the switching elements Q1 and Q2.

While the driving frequency of the EL element 41 in the circuit shown in FIG. 4 is set by the timing at which the switching elements Q1 and Q2 are turned on and off, the driving voltage includes harmonics higher than the driving frequency because of the series resonance characteristics of the series circuit 43. The frequency f and impedance z of the series circuit 43 are in a relationship as shown in FIG. 5 and thus, when the series resonance frequency of the series circuit is represented by f1, the series resonance frequency f1 must be set higher than the driving frequency f2 of the EL element in order to suppress the flow of high frequency components to the EL element 41.

This has resulted in a problem in that the life of an EL element is reduced by harmonic components. Further, the driving efficiency has been reduced because it has not been possible to drive an EL element using a series resonance frequency.

SUMMARY OF THE INVENTION

Under such circumstances, it is an object of the present invention to extend the life of an EL element and to improve driving efficiency by connecting a capacitor to a series circuit, which comprises an EL element and an inductor, in parallel to cause harmonic components to flow through the capacitor and to cause a driving frequency lower than the same to pass through the EL element.

DETAILED DESCRIPTION OF PREFERRED EMBODIMENTS

A driving circuit for an EL element according to an embodiment of the present invention will now be described.

Figure 1:
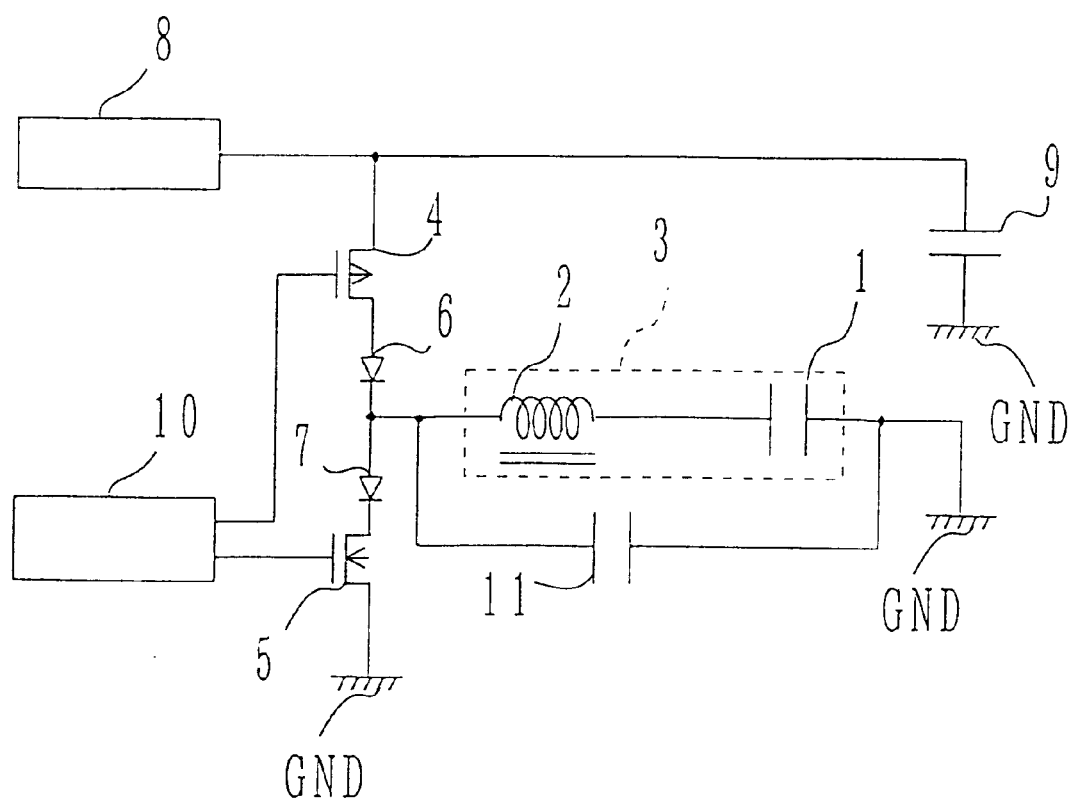
FIG. 1 illustrates a configuration of an embodiment of the present invention.

FIG. 1 illustrates a configuration of the present embodiment. As shown In FIG. 1, an EL element 1 and an inductor 2 are connected in series to form a series circuit 3.

A P-channel MOS transistor 4 and an N-channel MOS transistor 5 and the drains of them are series-connected to each other through diodes 6 and 7 whose forward direction is the direction from the P-channel MOS transistor 4 to the N-channel MOS transistor 5. One end of the inductor 2 of the series circuit 3 is connected to the point of connection between the diodes 6 and 7, whereas an end of the EL element 1 of the series circuit 3 opposite thereto is connected to a power supply terminal GND (0 V) to be grounded. 8 represents a constant power output circuit such as a DC-to-DC converter whose output is connected to the source of the P-channel MOS transistor 4 and a voltage stabilizing capacitor 9. The source of the N-channel MOS transistor 5 is grounded. 10 represents a control circuit which is responsible for controlling the turning on/off of the P-channel MOS transistor 4 and N-channel MOS transistor 5.

A capacitor 11 which is connected to the series circuit 3 in parallel and which is provided to prevent the application of frequency components higher than the driving frequency of the EL element to the EL element 1.

The operation of the present embodiment will now be described.

Figure 2A:
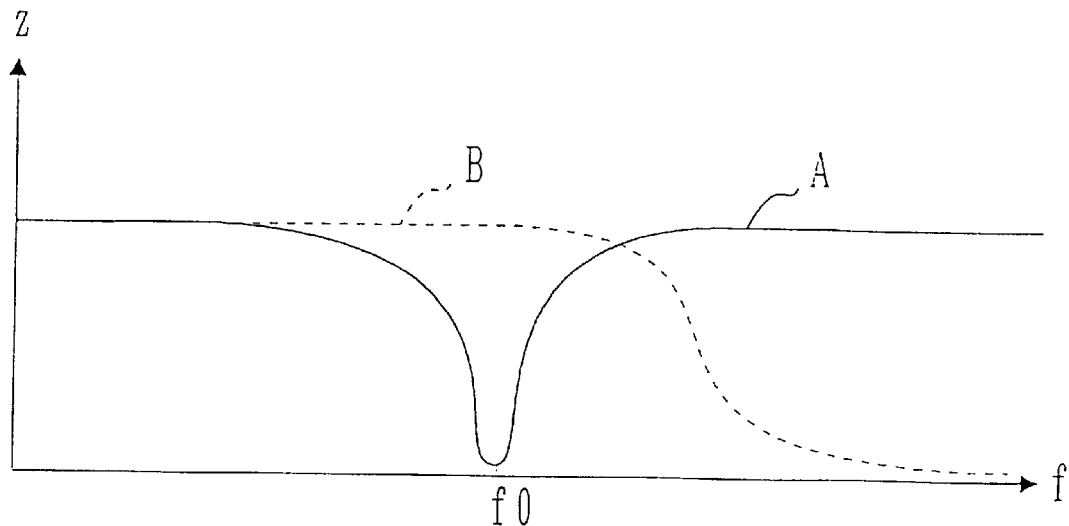
FIGS. 2A and 2B illustrate the operation of the embodiment in FIG. 1.
Figure 2B:
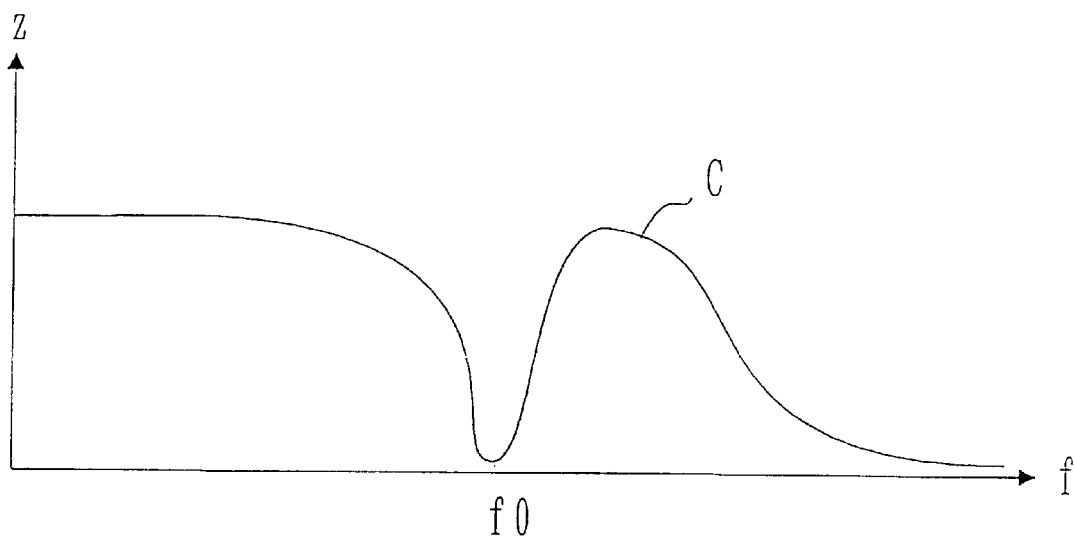

The P-channel MOS transistor 4 and N-channel MOS transistor 5 are alternately turned on and off to charge the EL element 1 in the direction from the constant power output circuit 8 to the P-channel MOS transistor 4, diode 6 and inductor 2 and to discharge the charge in the EL element 1 in the direction from the inductor 2 to the diode 7, N-channel MOS transistor 5 and power supply terminal GND. When the P-channel MOS transistor 4 is turned on, the series resonance characteristics of the series circuit 3 boost the voltage across the EL element 1 to a voltage higher than the output voltage of the constant power output circuit 8 which is a positive voltage of several hundred volts relative to the ground potential as a reference. When the N-channel MOS transistor 5 is on, the voltage drops to a negative voltage relative to the ground potential serving as a reference similarly. The frequency f and impedance z of the series circuit 3 are in a relationship as indicated by the solid line A in FIG. 2A, and the frequency f and impedance z of the parallel circuit formed by the inductor 2 and capacitor 11 are in a relationship as indicated by the broken line B. Therefore, when the series circuit 3 and the capacitor 11 in parallel therewith are viewed as a single load, the relationship between the frequency f and impedance z is represented by a synthesis of the solid line A and the broken line B as indicated by C in FIG. 2B. Harmonic components pass through the capacitor 11 to reduce the impedance. This suppresses the application of harmonic components to the EL element 1 to extend the life of the element. While it has been necessary to set the series resonance frequency of a series resonance circuit at a value higher than the driving frequency of an EL element in order to suppress the flow of high frequency components into the EL element according to the prior art, since harmonic components pass through the capacitor 11 here, a configuration may be employed wherein the series resonance frequency (f0 in FIGS. 2A and 2B) is equal to the driving frequency of the EL element. That is, an EL element can be driven with high efficiency by making the series resonance frequency and the driving frequency equal to each other. The reduction in the impedance in the harmonic region also contributes to the improvement of efficiency.

Figure 3:
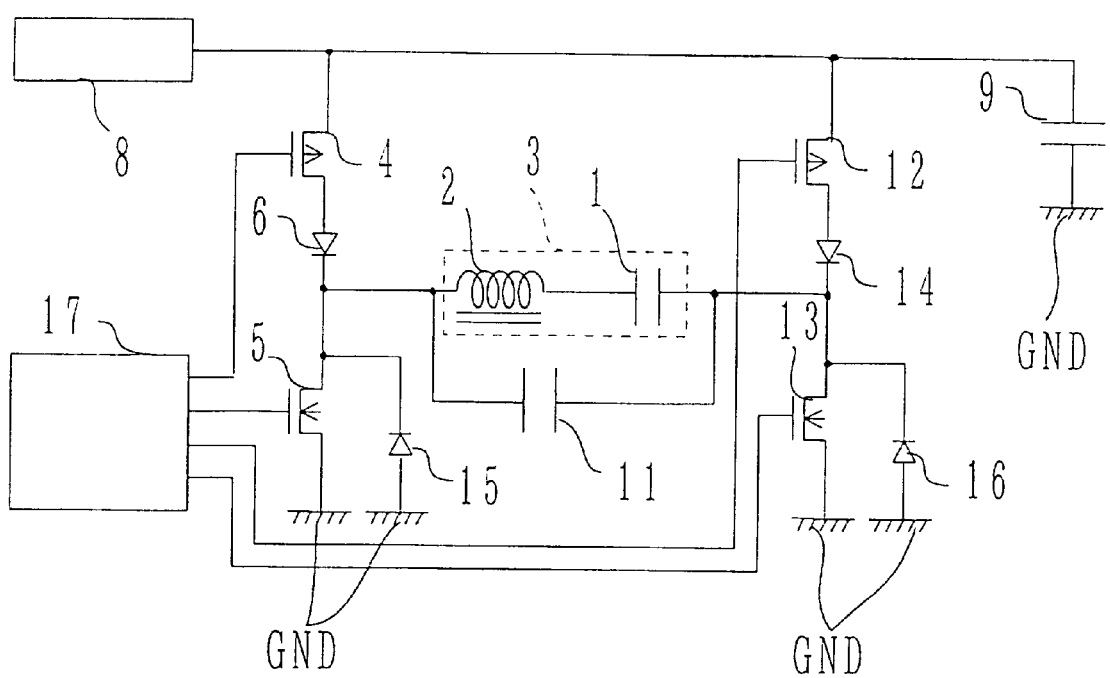
FIG. 3 illustrates another embodiment of the present invention.
Figure 4:
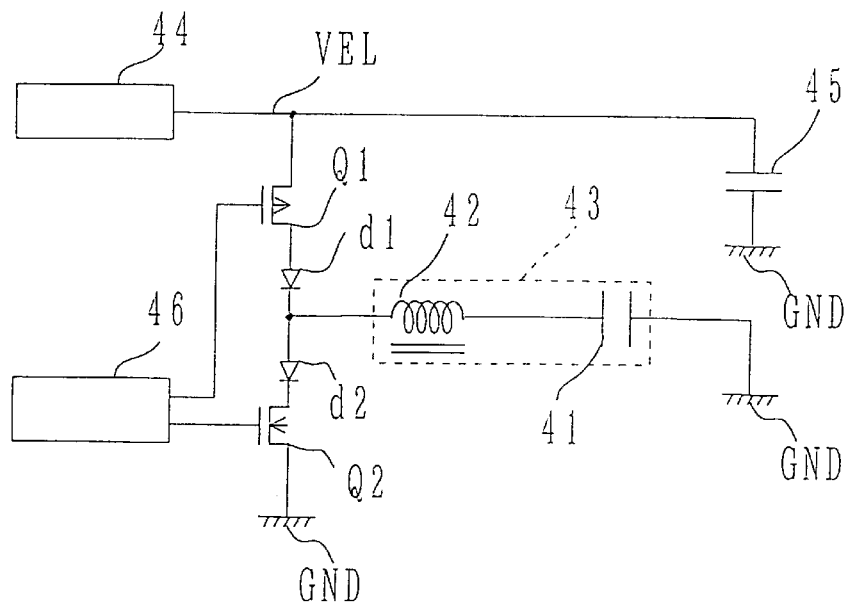
FIG. 4 illustrates a configuration according to the prior art.
Figure 5:
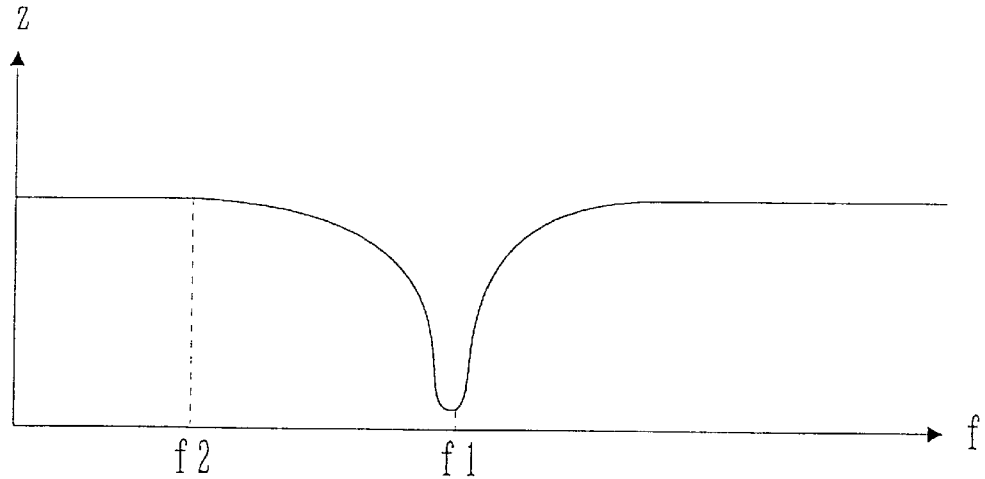
FIG. 5 illustrates the operation of the prior art shown in FIG. 4.

Although the EL element is charged and discharged from one of the terminals thereof in the above-described embodiment, the present invention is not limited thereto and may be equally applied to a case wherein bi-directional charging and discharging occur. The reference numerals in FIG. 3 identical to those in FIG. 1 indicate like components. 12 and 13 represent a P-channel MOS transistor and an N-channel MOS transistor, respectively, and 14 through 16 represent diodes. A control circuit 17 which controls the turning on/off of the P-channel MOS transistors 4 and 12 and the N-channel MOS transistors 5 and 13. Specifically, it causes a repetitive operation wherein the P-channel MOS transistor 12 is turned off and the N-channel MOS transistor 13 is turned on to charge and discharge the EL element 1 from the terminal toward the inductor 2 through the same operation as that in FIG. 1 and wherein, thereafter, the operation of the P-channel MOS transistor 4 and N-channel MOS transistor 5 and the operation of the P-channel MOS transistor 12 and N-channel MOS transistor 13 are switched so as to charge and discharge the EL element 1 from the terminal opposite to that toward the inductor 2.

Such a configuration also provides the same effects and advantages as in the above-described embodiment.

The present invention makes it possible to extend the life of an EL element compared to the prior art because the application of harmonic components to the EL element can be suppressed. Further, driving efficiency can be improved because the series resonance frequency of a series circuit and the driving frequency of an EL element can be made equal.

The foregoing discussion merely discloses and describes exemplary embodiments of the invention. As will be understood by those skilled in the art, the invention may be embodied in other specific forms without departing from the spirit and scope thereof. Accordingly, the disclosure of the present invention is intended to be illustrative, but not limiting, of the scope of the invention, which is set forth in the following claim.

What is claimed is:

1. A driving circuit for an electro-luminescence (EL) element, comprising:
   a series circuit formed by an EL element and an inductor connected to said EL element in series;
   a switching circuit for causing a bi-directional current to flow through said series circuit to charge and discharge said EL element; and
   a capacitor provided in parallel with said series circuit for suppressing the application of frequency components higher than a driving frequency of said EL element by routing a current having high frequency components through said capacitor thereby suppressing the application of said current having high frequency components through said series circuit.

2. The driving circuit for an electro-luminescence (EL) element of claim 1, wherein a resonance frequency of said series circuit and said driving frequency of said EL element are substantially equal.

3. The capacitor of claim 1 having an impedance to frequency relationship wherein the impedance decreases in value for a frequency higher than a resonance frequency of said series circuit.

* * * * *